United States Patent
Mähling et al.

(10) Patent No.: US 6,677,408 B1
(45) Date of Patent: Jan. 13, 2004

(54) METHOD FOR PRODUCING ETHYLENE HOMO-AND COPOLYMERS BY INTENSIVELY MIXING A REACTIVE REACTION COMPONENT WITH A MOBILE FLOW MEDIUM

(75) Inventors: Frank-Olaf Mähling, Mannheim (DE); Andreas Daiss, Mannheim (DE); Georg Groos, Dannstadt-Schauernheim (DE); Andreas Wölfert, Rappenau (DE)

(73) Assignee: Basell Polyolefine GmbH (DE)

( * ) Notice: Subject to any disclaimer, the term of this patent is extended or adjusted under 35 U.S.C. 154(b) by 75 days.

(21) Appl. No.: 10/009,923

(22) PCT Filed: Jun. 2, 2000

(86) PCT No.: PCT/EP00/05047
§ 371 (c)(1),
(2), (4) Date: Dec. 6, 2001

(87) PCT Pub. No.: WO00/77055
PCT Pub. Date: Dec. 21, 2000

(30) Foreign Application Priority Data

Jun. 10, 1999 (DE) .......... 199 26 223

(51) Int. Cl.$^7$ .................. C08F 2/06
(52) U.S. Cl. .......... 526/64; 526/352; 526/348; 526/227; 526/348.2; 526/348.5; 526/348.6; 526/82; 422/132
(58) Field of Search .......... 526/352, 348, 526/227, 348.2, 348.5, 348.6, 64, 82; 422/132

(56) References Cited

U.S. PATENT DOCUMENTS 3,405,115 A  10/1968  Schappert et al. ....... 260/94.9
3,721,126 A  3/1973   Beals et al. ............. 73/388
4,135,044 A  1/1979   Beals ..................... 526/64
4,175,169 A  11/1979  Beals et al. ............. 526/64
5,397,179 A * 3/1995  Berlin et al. ............ 366/337

FOREIGN PATENT DOCUMENTS

EP  0449092   10/1991
WO  96/35506   11/1996

* cited by examiner

Primary Examiner—David W. Wu
Assistant Examiner—William Cheung
(74) Attorney, Agent, or Firm—Connolly Bove Lodge & Hutz LLP

(57) ABSTRACT

The invention relates to a method for producing ethylene homo- and copolymers in a tubular reactor at pressures above 1000 bar and temperatures in the range from 120 to 350° C. by free-radical polymerization, in which firstly small amounts of free-radical chain initiators are added to a mobile flow medium comprising ethylene, molecular weight regulator and optionally polyethylene, and the polymerization is then carried out. In accordance with the invention, the mobile flow medium is firstly split into two volume elements flowing separately from one another, the volume elements flowing separately from one another are then set in rotation in opposite directions by means of suitable flow elements, the flowing volume elements rotating in opposite directions are then recombined to form a mobile flow medium, and then, at the moment of or shortly after the combining of the flowing volume elements rotating in opposite directions, the free-radical chain initiator is fed into the sheared interfacial region between the flowing volume elements rotating in opposite directions. The invention also relates to an apparatus for carrying out this method.

25 Claims, 1 Drawing Sheet

Figure 1:
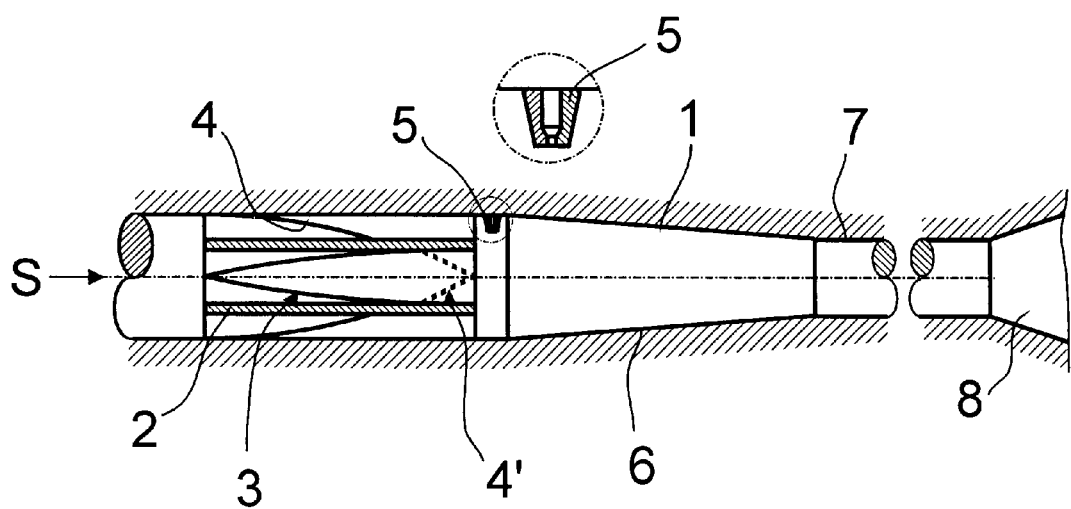

METHOD FOR PRODUCING ETHYLENE HOMO-AND COPOLYMERS BY INTENSIVELY MIXING A REACTIVE REACTION COMPONENT WITH A MOBILE FLOW MEDIUM

The present invention relates to a method for producing ethylene homo- and copolymers in a tubular reactor at pressures above 1000 bar and temperatures in the range from 120 to 350° C. by free-radical polymerization, in which firstly small amounts of free-radical chain initiators are fed to a mobile flow medium comprising ethylene, molecular weight regulator and optionally polyethylene, and the polymerization is then carried out.

The high-pressure polymerization process is a proven process for the production of low density polyethylene (LDPE) which is carried out highly successfully on a large industrial scale in numerous plants worldwide. The polymerization in high-pressure polymerization is usually initiated by atmospheric oxygen, by peroxides, by other free-radical formers or by mixtures of these. In practice, it has proven particularly advantageous to initiate the polymerization reaction "simultaneously" at a plurality of points within the reactor and thus to keep the reactor yield high and the product quality at a uniformly high level. To this end, the free-radical chain initiators employed for initiation of the polymerization have to be added to the reaction medium in a suitable manner.

The effectiveness of a selected free-radical chain initiator depends on how rapidly it is mixed with the initially introduced reaction medium in the individual case. To this end, so-called injection fingers are used in large-scale industrial plants in the production of high-pressure polyethylene. EP-A-0 449 092 describes how free-radical chain initiators, also referred to as initiators below, initiator mixtures or solutions of initiators in organic solvents, are metered in at a plurality of points along a reactor via injection fingers.

An improvement in the mixing of the metered-in initiator and consequently an improvement in the product quality has also been achieved by increasing the flow velocity in the mixing zones. U.S. Pat. Nos. 4,135,044 and 4,175,169 describe how products having very good optical properties can be produced in high yields and with a relatively low pressure drop over the length of the reactor by means of comparatively small tube diameters in the initiation and reaction zones of a high-pressure reactor, relative to the enlarged tube diameter in the cooling zone.

Finally, U.S. Pat. No. 3,405,115 describes the particular importance of uniform initiation of the polymerization reaction and of optimum mixing of the reaction components for the quality of the polyethylene, for a high reactor yield and for establishing uniform reactor operation. To this end, initiators are mixed with sub-streams of cold ethylene in a special mixing chamber and only thereafter fed to the actual reactor. In the mixing chamber, the fluid, in which the initiator does not decompose owing to the low temperature prevailing therein, is re-directed a number of times and passed through channels.

A common feature of all known methods and apparatuses for feeding free-radical chain initiators to the reaction mixture is that the rate and intensity of the mixing process are still unsatisfactory.

It was therefore an object of the present invention to indicate a method by which the high-pressure polymerization of ethylene in tubular reactors can be carried out with improved reactor yields, based on the added amount of free-radical chain initiator, and with improved product quality of the resultant polyethylene by increasing and intensifying the rate and intensity of mixing of the free-radical chain initiator with the mobile flow medium at the moment of feeding.

This object is achieved by a method of the generic type mentioned at the outset whose characterizing features are to be regarded as being that the mobile flow medium is firstly split into two volume elements flowing separately from one another, in that the volume elements flowing separately from one another are then set in rotation in opposite directions by means of suitable flow elements, in that the flowing volume elements rotating in opposite directions are then recombined to form a mobile flow medium, and in that, at the moment of or shortly after the combining of the flowing volume elements rotating in opposite directions, the free-radical chain initiator is fed into the sheared interfacial region between the flowing volume units rotating in opposite directions.

In an embodiment of the method which is preferred in accordance with the invention, the splitting of the mobile flow medium is carried out in such a way as to form a core stream and volume elements flowing close to the wall.

Molecular weight regulators which can be employed in accordance with the invention are customary polar or non-polar organic compounds, such as ketones, aldehydes, alkanes or alkenes having from 3 to 20 carbon atoms. Preferred molecular weight regulators are acetone, methyl ethyl ketone, propionaldehyde, propane, propene, butane, butene or hexene.

Free-radical chain initiators which can be used in accordance with the invention are peroxides, such as aliphatic diacyl ($C_3$ to $C_{12}$)peroxides, dialkyl ($C_3$ to $C_{12}$)peroxides or peroxyesters, tertiary-butyl peroxy-pivalate (TBPP), tertiary-butyl peroxy-3,5,5-trimethyl-hexanoate (TBPIN), di-tertiary-butyl peroxide (DTBP) or mixtures or solutions of these in suitable solvents. The free-radical chain initiators are, in accordance with the invention, introduced in amounts in the range from 10 to 1000 g/t of PE produced, preferably from 100 to 600 g/t of PE produced.

The mobile flow medium to which the above-mentioned free-radical chain initiators are fed in accordance with the invention may, besides ethylene, additionally comprise, as comonomer, 1-olefins having from 3 to 20 carbon atoms, preferably having from 3 to 10 carbon atoms, in an amount in the range from 0 to 10% by weight, based on the amount of ethylene monomer, preferably in an amount in the range from 1 to 5% by weight. In addition, the mobile flow medium may, in accordance with the invention, comprise polyethylene in an amount in the range from 0 to 40% by weight, based on the total weight of the monomers, preferably from 0 to 30% by weight.

In a particularly preferred variant of the method according to the invention, the free-radical chain initiators are introduced in a region of the tubular reactor in which the flow velocity of the mobile flow medium has been increased to between 1.2 and 2.8 times, preferably to between 1.8 and 2.5 times, the flow velocity within the feed zone of the tubular reactor through a reduction in the diameter of the tubular reactor to a value of from about 0.6 to 0.9 times the diameter D of the reactor in the feed zone. Expressed in absolute figures, the flow velocity of the mobile flow medium in the feed zone of the free-radical initiators is, in accordance with the invention, in the range from 10 to 40 m/s, preferably from 15 to 30 m/s, particularly preferably from 20 to 25 m/s.

The method according to the invention enables the amount of free-radical chain initiator added to be significantly reduced for the same amount of LDPE produced, and consequently enables the high-pressure polymerization to be carried out more economically.

Furthermore, the LDPE prepared by the method according to the invention has improved optical properties owing to smaller high-molecular-weight fractions having a molar mass of greater than $10^6$ g per mole.

In addition, the method according to the invention has the advantage that more stable reactor operation can be maintained at unusually high maximum temperatures of up to 350° C. without a tendency toward decomposition occurring.

A further advantage of the method according to the invention is to be regarded as the fact that the polymerization is initiated at lower temperatures and that the temperature increase of the reaction mixture then takes place in a more controlled manner. The life of the free-radical initiators, which usually have only a relatively short half life, is better utilized for the polymerization and thus for the production of LDPE.

The invention also relates to an apparatus for carrying out the method, comprising a tubular reactor section having an internal diameter D and a length in the range from 30 to 50·D, preferably from 35 to 45·D, and one or more feed nozzles for the free-radical chain initiator, whose characterizing features are to be regarded as being that separating elements for separating the mobile flow medium into volume elements flowing separately from one another are arranged in the interior of the tubular reactor over a length in the range from 2 to 6·D, in that in addition at least one flow element which is capable of setting a flow medium flowing along it in rotation is arranged in the region of the separating elements, and in that one or more feed nozzles for the free-radical chain initiator are arranged downstream of the separating elements and flow elements.

The separating element for the separation of the mobile flow medium is, in a preferred embodiment of the apparatus according to the invention, an internal tube having a diameter in the range from 0.5 to 0.7·D with which the mobile flow medium is separated into a core stream in the interior of the internal tube and a shell stream outside the internal tube, but inside the tubular reactor.

Flow elements which, in their geometrical form, viewed in the longitudinal direction, represent plates twisted by an angle of ±α are preferably arranged inside the internal tube and outside the internal tube, with the flow elements inside the internal tube and outside the internal tube being twisted in the same direction. The maximum length of the flow elements corresponds to the length of the internal tube, but the flow elements may also have smaller dimensions, where the angle α by which the plates are twisted should be at least 90°, but can just as well also be selected at a larger value in order to increase the rotation of the flowing volume element.

The feed nozzles, of which at least one, but preferably a plurality, are arranged, in accordance with the invention, in the flow direction, viewed at the end of the internal tube, have exit bores of at most 1 mm, preferably at most 0.7 mm, particularly preferably at most 0.5 mm. The separation of the feed nozzles from the end of the internal tube should be at most 1·D, preferably at most 0.5·D.

A conical transition piece, in the region of which the internal diameter of the tubular reactor is reduced from D to between about 0.9 and 0.6·D, is preferably located upstream of the separating elements for separating of the mobile flow medium into volume elements flowing separately from one another or downstream of the feed nozzle(s). The conical transition piece is located at a separation of at most 1·D, preferably at most 0.5·D, from the feed nozzle(s) or the separating elements and has a length in the range from 3 to 7·D, preferably in the range from 4 to 6·D.

In the course of the conical transition piece, the flow velocity of the mobile flow medium increases to between about 1.2 and 2.8 times, preferably to between 1.8 and 2.5 times, the flow velocity within the feed zone of the tubular reactor.

If the conical transition piece is arranged downstream of the feed nozzle(s), the actual reaction tube, which has a length in the range from 15 to 30·D, preferably from 20 to 27·D, and an internal diameter which corresponds to the internal diameter of the conical end part of the conical transition piece, is connected downstream of the conical transition piece.

In the course of the reaction tube, the high flow velocity is therefore maintained, ensuring that the mixing of the reaction components and the free-radical chain initiators within the mobile flow medium is virtually complete. After passing through the reaction tube at a high flow velocity, the flow velocity of the mobile flow medium can therefore be reduced again, which can take place in a second conical transition piece having a length which essentially corresponds to the length of the first conical transition piece.

If the conical transition piece is arranged upstream of the separating elements for separating the mobile flow medium into volume elements flowing separately from one another, the addition in accordance with the invention of free-radical chain initiators takes place in the front part of the reaction tube itself, in which an increased flow velocity already prevails. Although the reduced internal diameter of the reaction tube to between 0.9 and 0.6 D necessitates a reduction in the geometry of the separating elements and likewise of the flow elements, this arrangement may, however, in some cases have advantages in the metering of free-radical chain initiators and the initiation of the polymerization reaction, due to the higher flow velocity.

The lengths and diameters of the individual parts of the apparatus according to the invention can be varied in broad ranges, influencing the mixing quality and also the pressure drop within the reaction mixture. Furthermore, feed nozzles, injection fingers or injection nozzles of various designs can be combined with the apparatus according to the invention. The flow velocity of the mobile flow medium can, through variation of the mass flow velocity, adopt values in the range between 10 m/s and 40 m/s, preferably between 15 m/s and 30 m/s, particularly preferably between 20 m/s and 25 m/s.

The invention will be described more clearly below for the person skilled in the art by means of a drawing, without being restricted to the embodiment illustrated therein.

THE BRIEF DESCRIPTION OF THE DRAWING

FIG. 1 shows a side view of a vertical section through an apparatus according to the invention.

Reference symbols show the tubular reactor 1, which has a diameter D in the range from 20 to 100 mm. An internal tube 2, which, in the apparatus depicted, has a diameter of 0.6·D and a length of 4·D, is arranged in the feed zone of the tubular reactor 1. A flow element 3, which has the shape of a plate twisted by an angle of ±90°, is arranged inside the internal tube 2. Further flow elements 4, 4', each of which has the shape of a plate twisted by an angle of −90°, are arranged outside the internal tube 2, but still inside the tubular reactor 1. A feed nozzle 5, with the aid of which the free-radical chain initiator is fed into the sheared interfacial region of the flowing volume elements rotating in opposite directions, is arranged at a separation of 0.5·D from the end of the internal tube 2. The feed nozzle 5 has an exit bore with a diameter of 0.5 mm, which is shown in the detail enlargement. The conical transition part 6, by means of which the internal diameter of the tubular reactor is reduced to a value of 0.72·D, follows in the flow direction S at a separation of 0.5·D from the feed nozzle 5. The conical transition piece in the representation in FIG. 1 has a length of 5·D. The conical transition piece 6 is followed in the flow direction S by the reaction zone 7, which has a length, not shown in full, of 25·D, and which is followed by the second conical transition piece 8, likewise not shown in full, by means of which the internal diameter of the tubular reactor 1 is increased back to a value of D.

After the invention has now been explained in many details by the drawing, the following is intended to demonstrate the technical advantages of the invention more clearly to the person skilled in the art with reference to working examples.

EXAMPLE 1 COMPARATIVE EXAMPLE

The polymerization of ethylene was carried out in a tubular reactor having an internal diameter D of 39 mm at a throughput of 30 t/h under a pressure of 2900 bar. The free-radical chain initiator employed was a mixture of TBPP, TEPIN and DTBP. The molecular weight regulator employed was propionaldehyde in an amount of 0.048% by weight, based on the total weight of ethylene. The amount of free-radical initiators employed and the results of the polymerization are shown in the table at the end of the working examples.

EXAMPLES 2 AND 3 ACCORDING TO THE INVENTION

The polymerization of ethylene was carried out under the same conditions as in Example 1 using a mixing apparatus depicted in FIG. 1. The amount of free-radical initiators employed and the results of the polymerization are shown in the table at the end of the working examples.

EXAMPLE 4 COMPARATIVE EXAMPLE

The polymerization of ethylene was carried out in a tubular reactor having an internal diameter D of 39 mm at a throughput of 30 t/h under a pressure of 3000 bar. The free-radical chain initiator employed was again a mixture of TBPP, TEPIN and DTBP. The molecular weight regulator employed was propionaldehyde in an amount of 0.039% by weight, based on the total weight of ethylene. The amount of free-radical initiators employed and the results of the polymerization are shown in the table at the end of the working examples.

EXAMPLES 5 AND 6 ACCORDING TO THE INVENTION

The polymerization of ethylene was carried out under the same conditions as in Example 4 using a mixing apparatus depicted in FIG. 1. The amount of free-radical initiators employed and the results of the polymerization are shown in the following table.

Experimental parameters and results

| Exp. No. | TBPP consump. [g/t of PE] | TBPIN consump. [g/t of PE] | DTBP consump. [g/t of PE] | Scatter value [%] | Haze [%] | Density [kg/m$^3$] | MFI [dg/10 min] | Conversion [%] |
|---|---|---|---|---|---|---|---|---|
| 1 | 111 | 157 | 162 | 21.0 | 8.1 | 923.2 | 0.83 | 27.3 |
| 2 | 95 | 148 | 152 | 18.3 | 7.2 | 923.7 | 0.81 | 27.9 |
| 3 | 92 | 140 | 144 | 17.2 | 7.4 | 923.6 | 0.89 | 27.5 |
| 4 | 275 | 316 | 22 | 14.1 | 7.2 | 926.8 | 0.29 | 24.1 |
| 5 | 220 | 302 | 21 | 11.0 | 5.6 | 927.2 | 0.31 | 24.0 |
| 6 | 211 | 345 | 24 | 11.2 | 6.0 | 926.8 | 0.27 | 24.5 |

The product parameters shown in the above table were determined by the following measurement methods:
Scatter value: no standard
Haze: in accordance with ASTM D 1003
Density: in accordance with ISO 1183
MFI: as MFI $_{(190/2.16)}$[dg/min] in accordance with DIN 53735
Conversion: production [t/h]/ethylene throughput [t/h]

It is clear from the examples that the method according to the invention significantly improves the conversion and especially the product properties. It was possible to reduce the amount of free-radical chain initiators employed by about 20% in accordance with the invention, and the operating constancy of the tubular reactor was increased.

What is claimed is:

1. A method for producing ethylene homo- and copolymers in a tubular reactor at pressures above 1000 bar and temperatures in the range from 120 to 350° C. by free-radical polymerization, which comprises adding a free-radical chain initiator to a mobile flow medium comprising ethylene, molecular weight regulator and optionally polyethylene, and the polymerization is then carried out, and the mobile flow medium is firstly split into two volume elements flowing separately from one another, in that the volume elements flowing separately from one another are then set in rotation in opposite directions by means of flow elements, in that the flowing volume elements rotating in opposite directions are then recombined to form a mobile flow medium, and in that, at the moment of or shortly after the combining of the flowing volume elements rotating in opposite directions, the free-radical chain initiator is fed into the sheared interfacial region between the flowing volume units rotating in opposite directions.

2. The method according to claim 1, wherein the mobile flow medium is split in such a way that a core stream and a shell stream are formed.

3. The method according to claim 1, wherein the molecular weight regulator is a polar or nonpolar organic compound.

4. The method according to claim 1, wherein the free-radical chain initiator is at least one peroxide, or solution of said peroxide in a solvent in amounts in the range from 10 to 1000 g/t of polyethylene produced.

5. The method according to claim 1, wherein, besides ethylene, the mobile flow medium to which the free-radical chain initiator is fed additionally comprises, as the comonomer, a 1-olefin having from 3 to 20 carbon atoms, in an amount in the range from 0 to 10% by weight, based on the amount of ethylene monomer.

6. The method according to claim 1, wherein the mobile flow medium additionally comprises polyethylene in an amount in the range from 0 to 40% by weight, based on the total weight of the monomers.

7. The method according to claim 1, wherein the free-radical chain initiator is introduced in a region of the tubular reactor in which the flow velocity of the mobile flow medium has been increased to between 1.2 and 2.8 times, the flow velocity within the feed zone of the tubular reactor by reducing the diameter of the tubular reactor to a value of between about 0.6 and 0.9 times the diameter D of the reactor in the feed zone.

8. An apparatus for carrying out the method according to claim 1, comprising a tubular reactor section having an internal diameter D and a length in the range from 30 to 50·D, and one or more feed nozzles for the free-radical chain initiator, separating elements for separating the mobile flow medium into volume elements flowing separately from one another are arranged in the interior of the tubular reactor over a length in the range from 2 to 6·D, in that in addition at least one flow element which sets a flow medium flowing along said length in rotation is arranged in the region of the separating elements, and in that one or more feed nozzles for the free-radical chain initiator are arranged downstream of the separating elements and flow elements.

9. The apparatus according to claim 8, wherein the separating element for separating the mobile flow medium in an internal tube having a diameter in the range from 0.5 to 0.7·D, by means of which the mobile flow medium is separated into a core stream in the interior of the internal tube and into a shell stream outside the internal tube, but inside the tubular reactor.

10. The apparatus according to claim 8, wherein the flow elements which, in their geometrical form, viewed in the longitudinal direction, represent plates twisted by an angle of ±α are arranged inside the internal tube and outside the internal tube, with the flow elements inside the internal tube and outside the internal tube being twisted in opposite directions.

11. The apparatus according to claim 10, wherein the maximum length of the flow elements corresponds to the length of the internal tube, and in that the angle a by which the sheets are twisted is at least 90°.

12. The apparatus according to claim 8, wherein the feed nozzle, of which at least one, are arranged at the end of the internal tube, viewed in the flow direction, have exit bores of at most 1 mm.

13. The apparatus according to claim 8, wherein a conical transition piece, in the region of which the internal diameter of the tubular reactor is reduced from D to between about 0.9 and 0.6·D, is arranged upstream of the separating elements for separating the mobile flow medium into volume elements flowing separately from one another or downstream of the feed nozzle(s), and in that the conical transition piece is arranged at a separation of at most 1·D, from the separating elements or the feed nozzle(s) and has a length in the range from 3 to 7·D.

14. The apparatus according to claim 8, wherein the reaction tube, which has a length in the range from 15 to 30·D, and has an internal diameter which corresponds to the internal diameter of the conical end part of the conical transition piece, is arranged downstream of the conical transition piece.

15. The method according to claim 3, wherein said molecular weight regulator is a ketone, aldehyde, alkane or alkene having from 3 to 20 carbon atoms.

16. The method according to claim 15, wherein the molecular weight regulator is acetone, methyl ethyl ketone, propionaldehyde, propane, propene, butane, butene or hexene.

17. The method according to claim 4, wherein the free-radical chain initiator is tertiary-butyl peroxypivalate, tertiary-butyl peroxy-3,5,5-trimethyl-hexanoate, di-tertiary-butyl peroxide or mixtures or solutions of said peroxides in amounts in the range from 100 to 600 g/t of polyethylene.

18. The method according to claim 5, wherein the 1-olefin has from 4 to 10 carbon atoms in an amount in the range from 1 to 5% by weight.

19. The method as claimed in claim 6, wherein the mobile flow medium additionally comprises polyethylene in an amount up to 30% by weight, based on the total weight of the monomers.

20. The method according to claim 7, wherein the free-radical chain initiator is introduced into a region of the tubular reactor in which the flow velocity of the mobile flow medium has been increased between 1.8 and 2.5 times.

21. The apparatus as claimed in claim 8, wherein the tubular reactor section has an internal diameter D and a length in the range from 35 to 45·D.

22. The apparatus according to claim 12, wherein there is a plurality of feed nozzles arranged at the end of the internal tube, viewed in the flow direction, having exit bores of at most 0.7 mm.

23. The apparatus according to claim 12, wherein there is a plurality of feed nozzles arranged at the end of the internal tube, viewed in the flow direction, having exit bores of at most 0.5mm.

24. The apparatus according to claim 13, wherein a conical transition piece, in the region of which the internal diameter of the tubular reactor is reduced from D to between about 0.9 and 0.6·D, is arranged upstream of the separating elements for separating the mobile flow medium into volume elements flowing separately from one another or downstream of the feed nozzle(s), and in that the conical transition piece is arranged at a separation of at most 0.5·D, from the separating elements or the feed nozzle(s) and has a length in the range from 4 to 6·D.

25. The apparatus according to claim 14, wherein the reaction tube, which has a length in the range from 20 to 27·D.

* * * * *

UNITED STATES PATENT AND TRADEMARK OFFICE
CERTIFICATE OF CORRECTION

PATENT NO. : 6,677,408 B1
DATED : January 13, 2004
INVENTOR(S) : Frank-Olaf Mahling et al.

It is certified that error appears in the above-identified patent and that said Letters Patent is hereby corrected as shown below:

<u>Column 7,</u>
Line 46, "a" should read -- α --.

Signed and Sealed this

Thirteenth Day of April, 2004

JON W. DUDAS
*Acting Director of the United States Patent and Trademark Office*